M. B. McMANUS.
Sand-Pump Reel.
No. 198,652. Patented Dec. 25, 1877.
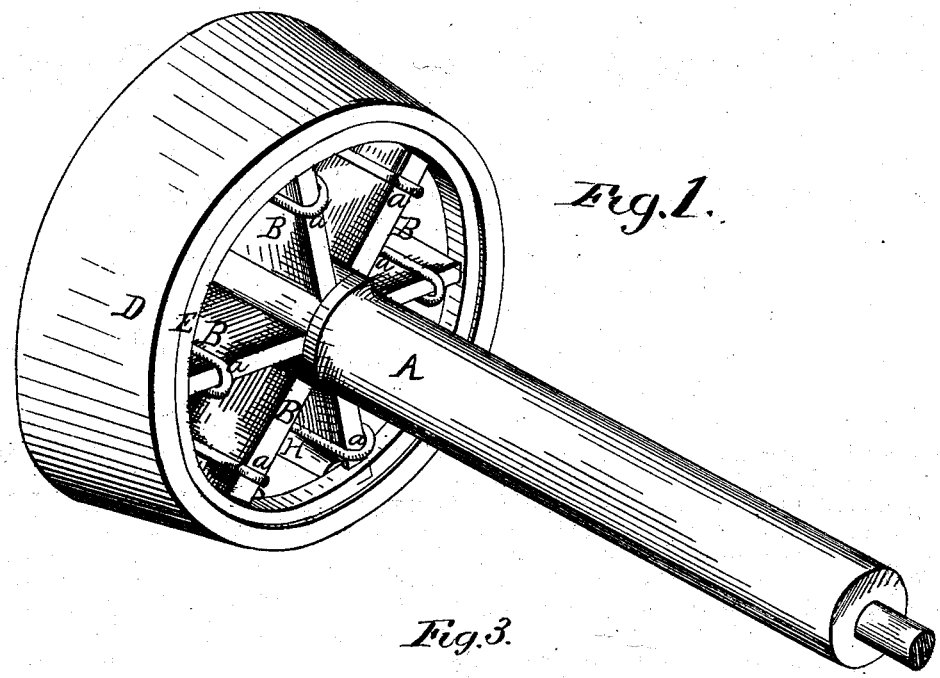
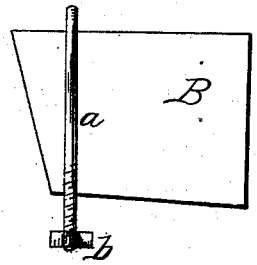
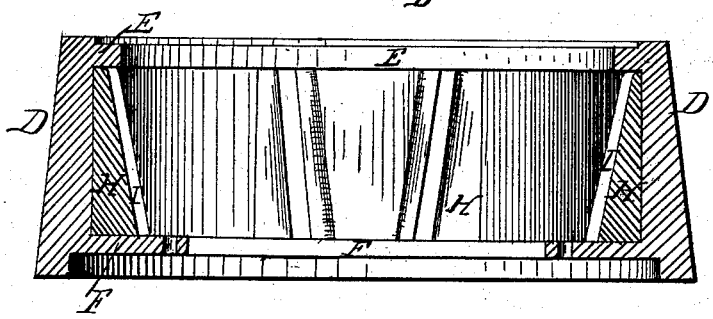
Witnesses
J. Walter Fowler
Chas. C. Gill
Inventor
M. B. McManus
By his Attys.
Cox and Cox

UNITED STATES PATENT OFFICE.

MICHAEL B. McMANUS, OF TITUSVILLE, PENNSYLVANIA.

IMPROVEMENT IN SAND-PUMP REELS.

Specification forming part of Letters Patent No. 198,652, dated December 25, 1877; application filed December 3, 1877.

*To all whom it may concern:*

Be it known that I, MICHAEL B. McMANUS, of Titusville, in the county of Crawford and State of Pennsylvania, have invented a new and useful Improvement in Sand-Pump Reels, of which the following is a specification, reference being had to the accompanying drawings.

The invention relates to an improvement in sand-pump reels; and consists in the devices hereinafter fully described.

The object of the invention is to furnish an efficient and durable sand-pump reel for Artesian wells.

In the accompanying drawings, Figure 1 represents a perspective view of a device embodying the elements of the invention; Fig. 2, a central transverse section of the wheel of same, and Fig. 3 a detached plan view of the spoke B and staple $a$.

A represents an ordinary reel-shaft, provided with six or more spokes, B, preferably six or eight being employed, upon which is mounted a beveled wheel, consisting of the rim D, cast or otherwise constructed with beading E on the inner periphery of its smaller end, and opposite this with the backing F. Between the backing F and beading E are placed, at suitable intervals, the cleats H, having central grooves or sockets I, into which the spokes B are fitted, and are retained therein by means of the staples $a$, which are placed over the spokes immediately in front of the cleats H, and have their ends passed through apertures in the backing F, in which position they may be secured and adjusted by the nuts $b$.

Heretofore the rim D of a sand-pump reel has been constructed without the beading E or backing F, and has been placed on an axle having but four spokes; but this construction has been proven inefficient, since the rim D unavoidably flattens or becomes depressed between the ends of the spokes. The object in using more than four spokes is to firmly support the rim, and prevent the depression above mentioned. The backing F and beading E not only strengthen the rim D, but also permit the same to be so adjusted upon the spokes that it can be removed and replaced with ease.

It is to be noticed that the ends of the spokes, as at present constructed, are beveled in conformity with the beveled rim, while in the invention herein described it is proposed to bevel the spokes in a contrary direction. Thus, in placing the wheel upon the shaft, the smaller end of same is adjusted over the spokes first, which spokes and wheel are then firmly secured by the staples and nuts before mentioned.

What I claim as my invention, and desire to secure by Letters Patent, is—

1. In a sand-pump reel, the rim D, having beading E and backing F, in combination with the spokes B, grooved cleats H, and staples $a$, substantially as expressed.

2. In a sand-pump reel, the combination of the spokes B, rim D, and cleats H, the ends of the spokes being beveled in a direction contrary to the bevel of the rim, substantially as described.

In testimony that I claim the foregoing improvement in sand-pump reels, as above described, I have hereunto set my hand.

MICHAEL B. McMANUS.

Witnesses:
 REINHARDT MILLER,
 R. B. FLEMING.